United States Patent
Sama et al.

(10) Patent No.: US 8,381,266 B2
(45) Date of Patent: Feb. 19, 2013

(54) METHOD AND SYSTEM FOR MACHINE IDENTIFICATION

(75) Inventors: Venkata Babji Sama, Bangalore (IN);
Suril Rajul Desai, Bangalore (IN);
Rammohan Varadarajan, Cupertino, CA (US)

(73) Assignee: Computer Associates Think, Inc., Islandia, NY (US)

( * ) Notice: Subject to any disclaimer, the term of this patent is extended or adjusted under 35 U.S.C. 154(b) by 292 days.

(21) Appl. No.: 12/911,275

(22) Filed: Oct. 25, 2010

(65) Prior Publication Data

US 2011/0099480 A1    Apr. 28, 2011

Related U.S. Application Data

(60) Provisional application No. 61/255,279, filed on Oct. 27, 2009.

(51) Int. Cl.
*H04L 9/00* (2006.01)
(52) U.S. Cl. .......................... 726/3; 715/736
(58) Field of Classification Search ....... 726/3; 715/736
See application file for complete search history.

(56) References Cited

U.S. PATENT DOCUMENTS

| | | | |
|---|---|---|---|
| 2008/0040802 A1 | 2/2008 | Pierson et al. | |
| 2008/0133420 A1* | 6/2008 | Barber | 705/75 |
| 2009/0037213 A1 | 2/2009 | Eisen | |
| 2009/0049560 A1 | 2/2009 | Lotspiech | |
| 2009/0183258 A1 | 7/2009 | Isogal et al. | |
| 2009/0217384 A1 | 8/2009 | Etchegoyen | |
| 2009/0248848 A1 | 10/2009 | Jeong et al. | |
| 2009/0271437 A1 | 10/2009 | Armour et al. | |

\* cited by examiner

*Primary Examiner* — Matthew Smithers
(74) *Attorney, Agent, or Firm* — Quinn Law Group, PLLC

(57) ABSTRACT

A method and system for identifying a machine used for an online session with an online provider includes executing a lightweight fingerprint code from a provider interface during an online session to collect and transmit machine and session information; generating and storing a machine signature or identity including a machine effective speed calibration (MESC) which may be used to identify the machine when the machine is used in a subsequent online session by a method of matching the machine signature and MESC to a database of machine identities, analyzing a history of the machine's online sessions to identify one or more response indicators, such as fraud indicators, and executing one or more responses to the response indicators, such as disabling a password or denying an online transaction, where the response and response indicator may be provider-designated.

20 Claims, 2 Drawing Sheets

METHOD AND SYSTEM FOR MACHINE IDENTIFICATION

CROSS-REFERENCE TO RELATED APPLICATIONS

This application claims the benefit of U.S. Provisional Patent Application No. 61/255,279, filed on Oct. 27, 2009, which is hereby incorporated by reference in its entirety.

TECHNICAL FIELD

The invention relates generally to uniquely identifying a machine used to conduct an online transaction and in particular to a computer executable method and system to generate a unique machine identification parameter to identify and evaluate a machine for risk potential and prevention.

BACKGROUND

With the widespread use of the internet to conduct business, online theft attempts have increased as well. As a result, it is vital to develop techniques to secure online transactions. An important problem in this context is one of identifying the computer that has been used to conduct a certain transaction. For example, if a user disputes that he never conducted a certain transaction, it will be useful for the service provider to be able to establish that the transaction under dispute has been conducted using a specific machine that belongs to the user.

Several techniques have been proposed for this problem. One such technique is to employ the difference between the time of the machine used for a transaction and the time of the server, as described by Eisen in U.S. Patent Application 2009/0037213. This approach presumes the server synchronizes its time periodically with accurate time clocks. In addition to the time difference this technique also suggests the use of other personal and non-personal information including the browser ID. This technique assigns different weights to the different entities of information. However, this technique of using time differences has limitations. For example, many service providers, such as banking institutions, are reluctant to employ methods with a probability of rendering false positives, because of the negative impact on legitimate customers. To minimize false positives using the method described by Eisen, the granularity on the time measurement probably has to be on the order of seconds. With default synchronization, the spread of most system clocks is probably no more than one to two minutes. So the number of comparison groups that can effectively be used is on the order of 25 to 50. This makes the time difference method reasonably useful as a risk input item, but not sufficiently precise to qualify as a unique system identifier or machine identity parameter.

Another technique is to store a time-stamped token in a machine. This token could possibly be encrypted, and can be retrieved at any time and used as a part of the fraud evaluation. However, it is easy to steal this token and move it to another machine. Another problem with this approach, or any similar approach dependent upon a cookie or other token stored on the machine, is the machine may block the storage or the cookie or token, rendering the approach ineffective.

Another technique is to download and install software on the machine to collect machine information and system configuration. However, many users and user machines block the installation of software downloads to collect this information. Another problem with this approach is the information collected can provide 50 to 60 properties which provide a level of uniqueness, but does not provide a fully unique identifier to distinguish the machine from another machine similarly or identically configured. The probability of multiple machines being identically configured is significant, for example, due to groups of institutionally purchased and identically specified machines and/or standardized production of computers, PDAs, etc., which further decreases the discrimination and uniqueness provided by this approach.

SUMMARY

The method and system to uniquely identify a machine used for an online session provided herein utilizes and exploits the inherent and unavoidable variability in the manufacturing processes used to produce the components of the machine. The method provided herein uses the knowledge that the speed of any machine (computer, mobile phone, PDA) is unique to that individual machine (computer, mobile phone, PDA). Any two machines that have the same specified speed (two computers each specified at 3 GHz and identically configured, by way of a non-limiting example) will have actual speeds that are different. Therefore, if the same program is run on each of these two machines, the runtimes will be different. Accordingly, the time it takes to run a standard piece of code, such as a fingerprint code (FPC), on each machine can be used as a signature for each machine. This machine signature can be transformed into a machine effective speed calibration (MESC) which can be generated to identify a particular machine during an initial online session with a provider interface, such as a website. The method to collect the machine signature can be repeated during a subsequent online session, from which the MESC can be generated and matched by the provider to identify the particular machine as the same machine used for the initial session. Normalization of the MESC can be used to detect changes to certain machine attributes so that the MESC can be updated for continued identification of the modified machine.

The advantages of having a technique to uniquely identify a machine used during an online session or online transaction can be further expanded if the machine, once identified, can be matched to a unique machine history file, which may also be referred to as a machine identity history file, or a machine identify file. The unique machine identity history file, which may store a history of online sessions of the machine with a single provider or multiple providers, wherein each online session is represented by its own session dataset, can be analyzed to identify transaction patterns and for security risk indicators such as multiple login failures. Each session dataset may contain the session and machine information collected by an FPC during that session, the machine identity including an MESC generated for that session, and other information such as the user interface and version and the provider interface and version used by the machine to conduct the online session with the provider. Additional information, such as prior usage of the machine in fraudulent transactions, provider account information, or provider transactional information, can also be stored to the machine history file and retrieved during an online session, such that the online provider can initiate appropriate responses and counteractions during the session, potentially preventing fraud or security breaches.

A system and method is provided herein for identifying a machine used for an online session with a provider and includes accessing a provider interface, such as a provider webpage or website or other internet interface, during an online session using a machine configured for online access. The machine may be, for example, a computer, notebook, netbook, telephone, mobile device, and personal digital assistant or device configured for online access. The machine may access the internet through a user interface, which may be a browser such as Internet Explorer™, Google Chrome™, Apple Safari™, or Mozilla Firefox™, or any another mechanism configured as a user interface, such as Adobe Reader™.

The provider interface includes a fingerprint code which is executed when the machine accesses the provider interface. The fingerprint code collects information during the online session. The fingerprint code is preferably a light weight and portable client with no footprint, such as JavaScript, Flash or pure Java.

The session information may include, by way of a non-limiting example, machine information, for example, machine hardware and software configuration, serial numbers and versions; processor speed, memory speed, graphics capabilities, memory latency, actual and relative machine load and power supply characteristics. The machine information may include information regarding multiple independent attributes of the machine and its components. These include, but are not limited to, attributes and characteristics of the machine processor, memory, hard disk, graphics card, etc. The session information may further include information regarding the user interface and the provider interface, for example the browser type and browser version of the user interface, and session transactional information, such as number of password attempts, from the provider interface. The machine may be used to access a plurality of provider interfaces, where each of the provider interfaces may execute a fingerprint code to collect session information. The session information collected may identify the respective provider interface accessed by the machine for that session. Where the machine is connected through a proxy or gateway server during an online session so as to prevent the machine IP from being visible to the provider interface or server, the fingerprint code may be configured to create a socket to the proxy or gateway server to detect the machine IP address.

The machine information may include machine information resultant from executing the fingerprint code, for example, the runtime of one or more iterations of a portion of the fingerprint code, or the number of iterations completed by a portion of the fingerprint code in a fixed amount of time. The session information collected by the fingerprint code is transmitted to a machine identity generator from the provider interface. The machine identity generator, which may be resident on a provider server or another server, transforms a portion of the session information to generate a machine identity including a machine effective speed calibration (MESC). Because the machine effective speed calibration is derived using the actual speed characteristics of the particular machine, and because the actual speed characteristics of the particular machine are the result of a combination of components which are non-identical to similar components in other machines, due to at the least, the manufacturing variability of each component, the machine effective speed calibration will be unique to that machine.

A machine may have more than one machine effective speed calibration (MESC), where each may act as a machine signature to uniquely identify the machine. An MESC may be combined with one or more other MESCs, or with other characteristics, such as machine load or browser type, to create a unique machine identity or signature. An MESC may be calculated by various methods, for example, using the runtime of one or more iterations of a portion of the fingerprint code, or by using the number of iterations completed by a portion of the fingerprint code in a fixed amount of time. As another example, an MESC may be calculated by determining an average or other statistical parameter to a sample group of a characteristic represented in the session information, or applying a clustering algorithm to various elements or characteristics of the session information.

The method and system provides for generating a machine identity history file corresponding to a particular machine, where the particular machine identity history file may include multiple machine identities which each correspond to that particular machine. The multiple machine identities in the particular machine identity history file may each have been generated based on session information collected in separate online sessions between the particular machine and the provider interface. The machine identity generated by the particular machine used in a prior session and the machine identity generated by the particular machine in a subsequent session may be identical, and therefore easily matched to identify the machine in the subsequent session as the same machine used in the prior session. Alternatively, the prior and subsequent machine identities may be nearly identical and may be matched by, for example, further analyzing or normalizing the session information for compensating factors such as a different user interface type or version used in the prior session and subsequent session, where the analysis normalization supports matching the subsequent machine identity with the prior machine identity to properly identify the machine in the subsequent session as the same machine used in the prior session.

The method and system provides for a machine identity comparator which is used to compare the machine identity or MESC generated for a machine in a subsequent online session to machine identities generated for a machine in one or more prior online sessions and stored in a machine identity history file to determine if the machine used for the subsequent online session is the same machine used for the prior session(s). The machine identity history file may be stored in a database, which may be a provider database or another, for example, a third party database. The database may include numerous machine identity history files, with each file corresponding to a unique machine. Each machine identity history file may include numerous session datasets, where each dataset corresponds to an individual online session.

The machine identity comparator is further configured to compare a machine identity from a current online session to numerous machine identity history files to determine whether the machine used in the current online session is a new machine or corresponds to a machine identity pre-existing in the database. If the machine identity from the current session is matched to a pre-existing machine identity in the database, then the matched machine identity history file is updated by adding the current session dataset including the current machine identity and session information. Further, upon matching, it is determined that the current machine is the machine corresponding to the matched machine identity history file, and that the machine has previously accessed the provider interface. If the machine identity cannot be matched to a pre-existing machine identity in the database, a new machine identity history file is created and the session dataset including the current machine identity and corresponding session information is stored in the new file, and it is determined that the current machine is a new machine, e.g., a machine which has not previously accessed the provider interface.

When it is determined that the current machine is matched to a machine that has previously accessed the provider interface for which a machine identity history file exists, the machine identity comparator may be configured to review and analyze the machine history file for response indicators. When the presence of one or more response indicators is detected in the machine identity history file, the machine identity comparator may be further configured to execute one or more responses corresponding to the one or more response indicators that have been detected. The machine identity comparator may be configured to either selectively or automatically analyze a file for response indicators and/or execute a response. The file analysis and execution of one or more responses may also be performed, for example, by a provider or third party server.

The response indicators may include for example, a fraud indicator, a security indicator or a false identity indicator which may indicate a response must be executed, where the response may be, for example, collecting additional information, requesting additional information, elevating security, requiring secondary password validation, disabling a password, denying an online transaction, denying access to the provider interface and/or terminating a session.

The method and system to identify a machine used to access more than one provider interface using more than one user interface is provided. A particular machine identity history file is stored in a common database accessible by multiple providers. Each provider interface of the multiple provider interfaces uses a footprint code, which may be a common footprint code, to provide machine and session information which may also identify the particular provider interface being accessed, to a machine identity generator. Each provider interface uses the machine identity generator, which may be a common MESC generator, to generate a machine identity for a machine accessing that provider's interface, which is provided to a machine identity (MESC) comparator. The machine identity comparator compares the machine identity to the MESC database. If a match is identified with a machine identity history file, the machine identity comparator may review and analyze the current session information and the matched machine identity history file for response indicators.

The response indicators may include one or more response indicators which have been designated by a specific provider, such that the machine identity history file may be selectively analyzed for that response indicator only when the current session information indicates the current session is an online session with the specific provider designating that response indicator. Accordingly, then review and analysis of the machine identity history file may be customized or administered by or specific to an individual provider and provider interface, and the response indicators may include, for example, a response indicator related to the machine user's account information or transaction history with that provider or provider interface. If a response indicator is detected, the machine identity comparator may automatically or selectively execute a response during the current online session with the provider interface, as previously discussed, or may transmit detection of the response indicator to the provider server or provider interface, such that the provider can determine and execute the appropriate response. The response, similar to the response indicator, may be specific to or designated by an individual provider or provider interface. This additional configuration of the method and system to identify a machine is advantaged by a larger database of machine identity history files compiled from machine sessions with multiple provider interfaces. Another advantage of consolidating the machine identities and related session information from multiple provider interfaces is the decreased time to compile a machine identity history file for a particular machine, which may decrease the time required to identity response indicators and execute responses, for example, earlier detection and counteraction of a machine being used for fraudulent online transactions.

The above features and advantages and other features and advantages of the present invention are readily apparent from the following detailed description of the best modes for carrying out the invention when taken in connection with the accompanying drawings.

DESCRIPTION

Figure 1:
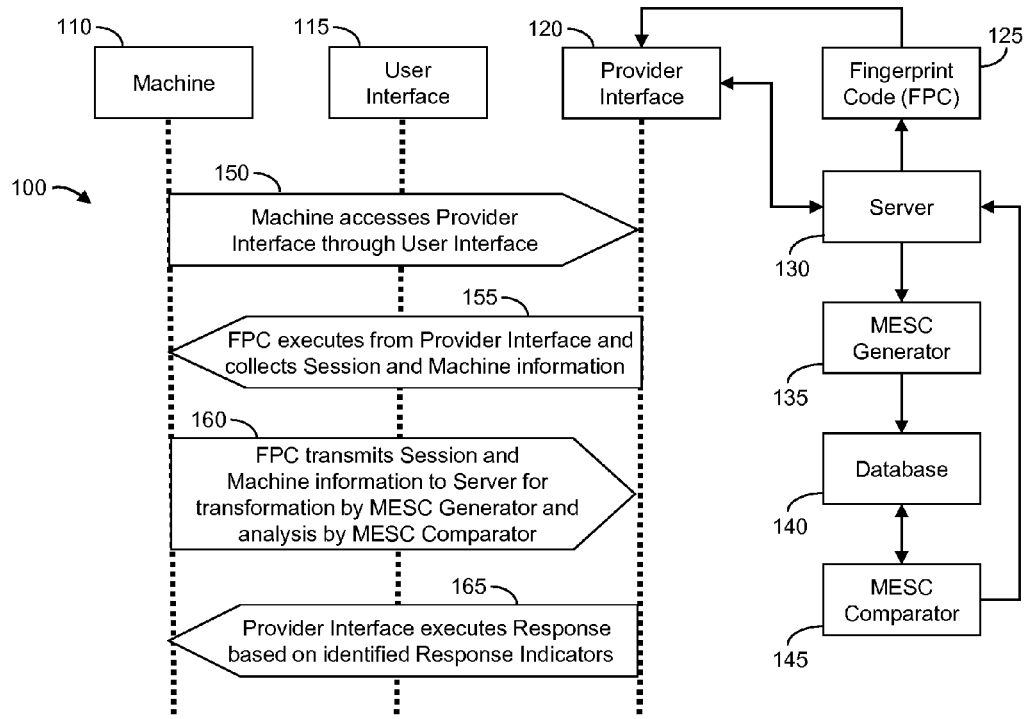
FIG. 1 is a schematic illustration of a system and method for establishing a unique machine identifier for a machine used to access a provider interface.

Referring to the drawings wherein like reference numbers correspond to like or similar components throughout the several figures, FIG. 1 shows, generally indicated at 100, a schematic illustration of a system for establishing a unique machine identifier for a unique machine 110 used to access a provider interface 120. The machine 110 is configured for online access and may be, for example, a laptop, computer, netbook, notebook, telephone, mobile device, personal digital assistant, or other device configured to access the Internet. The machine 110 includes a memory, a central processing unit (CPU), a hard disk, a graphics card, a display and other components as typically included in a device such as the machine 110. The memory of the machine 110 can include, by way of example, Read Only Memory (ROM), Random Access Memory (RAM), electrically-erasable programmable read only memory (EEPROM), etc. The machine 110 accesses provider interface 120 through a user interface 115, which may be a browser, during an online session.

The provider interface 120 may be, in a non-limiting example, a webpage, a website or other mechanism used by a provider to interface with users within the Internet. The user interface 115 can be one of a plurality of browsers available for user interface to the Internet, for example, Internet Explorer® or Mozilla Firefox®. The user interface 115 could also be a non-browser mechanism for user interface to the Internet, for example, Adobe Reader®, within the scope of the claimed invention.

Generally indicated at step 150, the machine 110 initiates an online session, e.g., the current session, to access the provider interface 120 through the user interface or browser 115. The machine 110 may be accessing provider website 120 for any purpose, for example, to view unsecured information, access secured account information, or execute a transaction. Generally indicated at step 155, the provider interface 120 executes a fingerprint code 125, or FPC, upon initiation of the online session with the machine 110. The fingerprint code (FPC) 125 is preferably a lightweight and portable client with no footprint, such as JavaScript™, Flash® or pure Java™. As would be understood, any lightweight code, including generic code, could be used for the fingerprint code 125 described herein.

Figure 2:
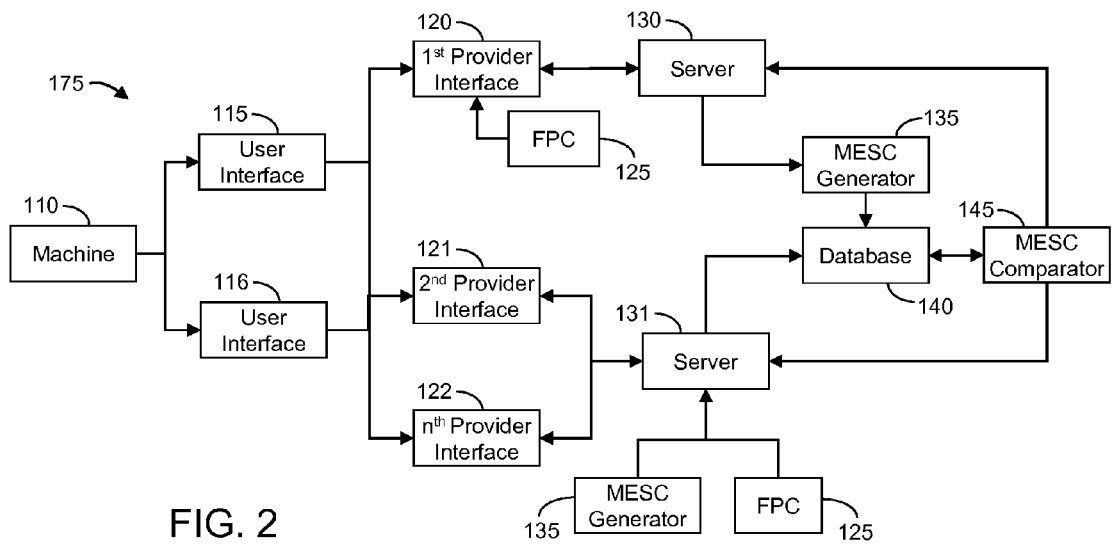
FIG. 2 is a schematic illustration of another configuration of the system of FIG. 1.
Figure 3:
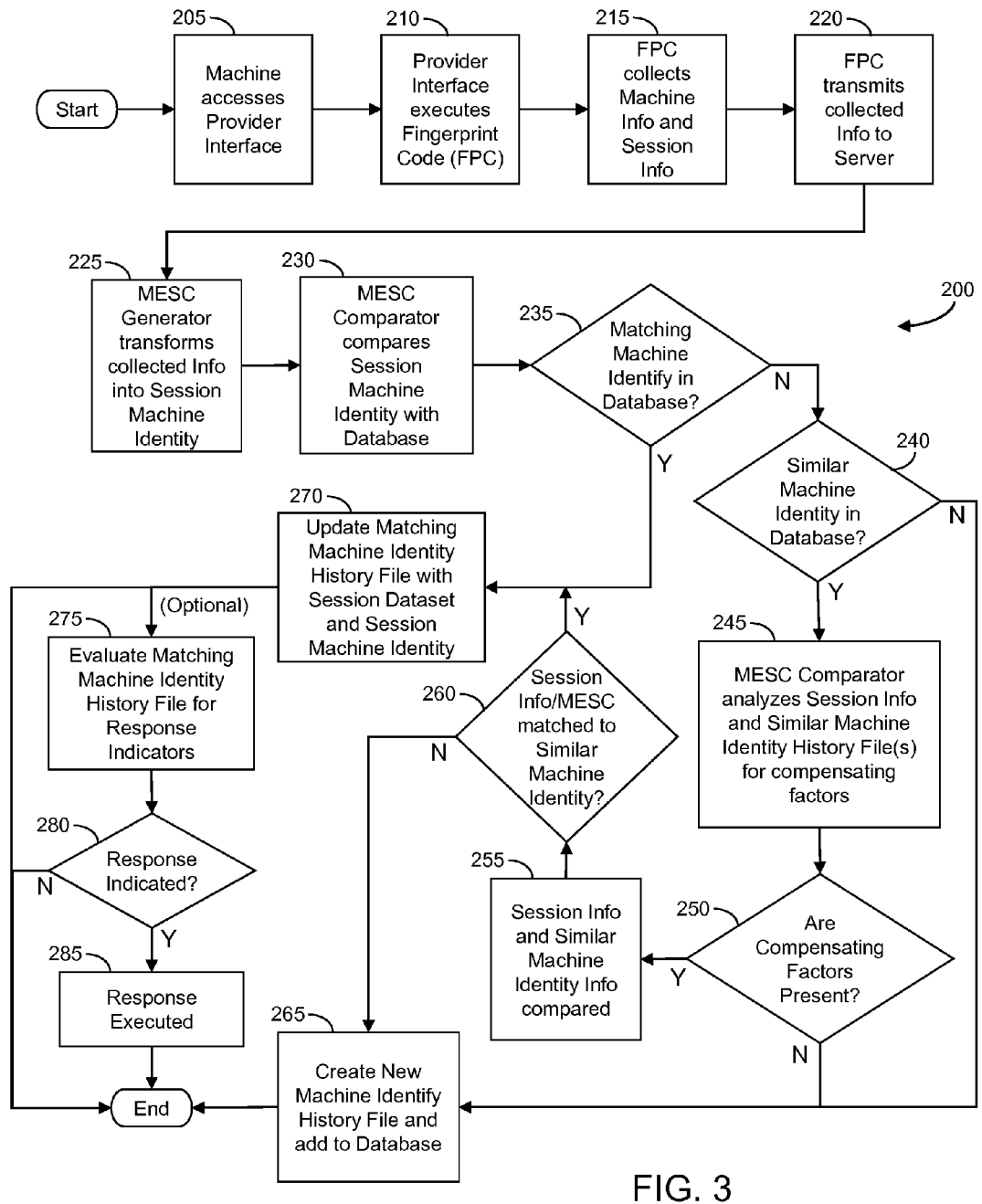
FIG. 3 is a schematic illustration of a method for identifying and evaluating a machine using the unique machine identifier generated using the system of FIG. 1.

Returning to FIG. 1, the fingerprint code 125 collects information at step 155 from the machine 110 and related to the current online session, using a method which will be further described in detail, and transmits the session information and machine information at step 160 to a server 130 for transformation by an MESC generator 135 to a unique machine identity including a machine effective speed calibration (MESC) using a method which will be further detailed in the description of the method of FIG. 3. The server 130 includes a memory and a central processing unit (CPU), and is adaptable to interface with one or more provider interfaces 120, 121, 122 (see FIG. 2) and may include, for example, an MESC generator 135, an MESC comparator 145, a fingerprint code 125 and their associated algorithms. The server 130 may include or be adapted to access one or more databases 140 including machine identity information, session and machine information and other information related to machine identification and the methods and systems as described herein. The memory of the server 130 can include, by way of example, Read Only Memory (ROM), Random Access Memory (RAM), electrically-erasable programmable read only memory (EEPROM), and is of a size and speed sufficient for conducting the machine identification processes or other related tasks as described herein.

The information collected at step 155 may include session and/or machine information, where the session information may be configured to include the machine information. The session information collected may include, by way of non-limiting example, machine information from the machine 110, for example, hardware and software configuration of the machine 110, the associated serial numbers and versions; processor speed, memory speed, graphics capabilities, memory latency, actual and relative machine load and power supply characteristics of the machine 110. The machine information collected from machine 110 may include information regarding multiple independent attributes of the machine and its components. These include, but are not limited to, attributes and characteristics of the machine processor, memory, hard disk, graphics card, etc. The session information may further include information regarding the user interface 115 and the provider interface 120, for example the browser type and browser version of the user interface 115, and session transactional information, such as number of password attempts, from the provider interface 120. The machine 110 may be used to access a plurality of provider interfaces, including the provider interface 120 and, for example, the second and nth provider interfaces 121, 122 (see FIG. 2) where each of the provider interfaces 120, 121, 122 may execute a fingerprint code to collect session information specific to an online session with the machine 110. The session information collected may identify the respective provider interface 120, 121, 120 accessed by the machine 110 for that respective session.

The MESC generator 135, which may also be referred to as a machine identity generator 135, may also be incorporated into the fingerprint code 125, such that the transformation of the session information and machine information may be accomplished by the fingerprint code 125 without the need for a separate MESC generator 135. The MESC generator 135 provides the unique machine identity, including the MESC, to a database 140 and an MESC comparator 145, for analysis.

The machine identity database 140, also referred to as the MESC database, is comprised of machine identity history files, where each machine identity history file corresponds with a unique machine 110 used for one or more online sessions. Each unique machine identity history file includes one or more datasets, which each may be referred to as a session dataset. Each session dataset in a machine identity history file includes the session information including the machine information, and a machine identity including an MESC for a single session between one of a plurality of machines, for example, the machine 110, and an online provider, for example, the online provider 120.

FIG. 2 shows the system of FIG. 1 configured such that the database 140 may be accessed and/or used by a plurality of online providers 120, 121, 122, and the datasets included in a unique machine history file may include the session information and machine information for online sessions conducted by one of a plurality of machines with one or more of the multiple online providers, including a first provider interface 120, a second provider interface 121, and so on, through an nth provider interface 122. The machine 110 may be configured to use one or more user interfaces, shown in FIG. 2 as user interfaces 115, 116 to conduct online sessions with one or more of the provider interfaces 120, 121, 122. For example, user interface 115 may be a browser such as Mozilla Firefox®, and user interface 116 may be a different browser such as Internet Explorer® or a non-browser interface such as AdobeReader®. In the configuration shown in FIG. 2, the database 140 can also be a distributed database which may be synchronized and consolidated for selective data either at real time or at regular intervals.

The MESC comparator 145 compares the machine identity generated from machine 110 being used for the current online session to the machine identity database 140 to determine if the current machine identity can be matched to a prior machine identity in the database 140, and to further identify the unique machine 110 being used in the current online session. The matching method performed by the MESC comparator 145, shown generally in FIG. 1 at 160, will be detailed further in the description of the method of FIG. 3.

If the MESC comparator 145 fails to match the machine identity of the current machine 110 to an existing machine identity in the database 140, the MESC comparator 145 generates a new machine identity history file in the database 140, corresponding to the current machine 110. The machine identity and machine and session information from the current online session collected from machine 110 is added as a dataset into the newly created machine identity history file in the database 140. Further, the current machine 110 is determined to be a new machine accessing the provider interface for an initial, or first, online session.

If the MESC comparator 145 is successful in matching the machine identity of the current machine 110 to an existing machine identity in the database 140, the machine identity including the MESC and machine and session information from the current online session collected from machine 110 is added as a dataset into the matching machine identity history file in the database 140. Further, the current machine 110 is determined to be the same machine as the machine corresponding to the matching machine identity history file.

After a match is determined, the MESC comparator 145 may initiate a review and analysis of the matching machine identity history file, as shown generally in FIG. 1 at 160, for the presence of response indicators. A response indicator may be, for example, a record in the history file indicating that the machine has been previously used for a fraudulent transaction or has been used for multiple failed login and password attempts. A response indicator may also be, for example, a fraud indicator, a security risk indicator or a false identity indicator that is derived by analysis of the multiple datasets in the history file, or analysis of the session and machine information included in datasets, for patterns and other indicators. A response indicator may be a provider administered or provider-designated indicator, for example, derived from other transaction or provider account information. The examples of response indicators provided herein are not intended to be limiting. It is understood that other response indicators are possible with the system and methods described herein.

When one or more response indicators is detected in the matching machine identity history file, the MESC comparator 145 may select and execute a response to process, address and/or counteract the detected response indicator or indicators. Non-limiting examples of possible responses include collecting additional information, requesting additional information, elevating security, disabling a password, denying a transaction, denying access, and terminating a session, or a combination of these or other actions for the purpose of managing internet security and/or the provider-user transactions or account. The response may be selected and executed either automatically or selectively within the scope of the claimed invention. For example, if a response indicator is detected, the machine identity comparator 145 may transmit detection of the response indicator to the provider server 130 or provider interface 120, such that the provider can automatically or selectively determine and execute the appropriate response. The response may be a provider administered or provider-designated response, for example, derived from or related to other transactional or provider account information.

The analysis of the machine identity history file for response indicators and the selection and execution of responses may be performed by a system element other than an MESC comparator 145, for example, the analysis could be performed by the fingerprint code (FPC) 125, the MESC generator 135, computer code on a provider server 130 or provider interface 120, a third-party server or interface (not shown), or otherwise located within the system 100 or system 175, similar attributes or characteristics or a combination thereof.

FIG. 2 shows, generally indicated at 175, an alternate configuration of the system shown in FIG. 1 with additional features and capabilities. The system 175 is configured to identify a unique machine 110 when the machine 110 initiates an online session with any one of a plurality of provider interfaces including a first provider interface 120, a second provider interface 121, and a plurality of additional provider interfaces up to and including an nth interface 122. As discussed previously, the respective provider interfaces 120, 121, 122 may each be a website of the respective first, second, and nth providers, in a non-limiting example. The machine 110 may access any of the n provider interfaces 120, 121, 122 through one or more user interfaces, shown in FIG. 2 as 115 and 116, where the user interface 115 may be a first browser and the user interface 116 may be the nth browser of a plurality of n browsers or user interfaces used by machine 110 to access online providers 120, 121, 122. The database 140 is accessible by the online provider interfaces 120, 121, 122 through one or more servers 130, 131. In a non-limiting example, the server may be a provider specific server interfacing with the database 140 and a single provider website 120 such as server 130 in FIG. 2, or may be a shared server such as server 131 in FIG. 2, interfacing with a common or shared database 140 and with more than one provider websites 121, 122. Each provider interface 120, 121, 122 uses a footprint code, which may be a common FPC 125, to collect and transmit session information to an MESC generator 135. Each provider 120, 121, 122 uses a machine identity generator, which may be a common or shared MESC generator 135, to generate a machine identity for machine 110 when machine 110 accesses one of the respective provider interfaces 120, 121, 122. The MESC generator 135 transforms the machine and session information provided by FPC 125 into a machine identity including an MESC and provides the machine identity and machine and session information to a common machine identity (MESC) comparator 145 in communication with shared database 140. The machine identity comparator 145 may also be referred to as an MESC comparator.

The MESC comparator 145 compares the machine identity including the MESC to the shared database 140, according to the process described for FIG. 1. If a match is identified with a machine identity history file, the machine identity comparator may review and analyze the machine identity history file for response indicators. The system 175 shown in FIG. 2 provides additional capabilities to the system 100 shown in FIG. 1 in part by providing an expanded or larger shared database 140 of machine identity history files compiled from prior online sessions with the multiple provider interfaces 120, 121, 122. The consolidation of machine identity history files and their included datasets from online sessions from multiple provider interfaces in a shared database 140 may increase the probability of identifying the machine 110 to a matching machine file and decrease the time to compile a machine history file with sufficient datasets to detect response indicators, especially those which are pattern dependent, providing the opportunity for earlier detection and counteraction of a machine being used, for example, to complete fraudulent online transactions.

If a response indicator is detected, the machine identity comparator 145 may automatically or selectively execute a response, as previously discussed for FIG. 1, or may transmit detection of the response indicator to the respective provider server 130, another server 131, or provider interface 120, 121, 122, such that the provider can selectively or automatically determine and execute the appropriate response according to the respective provider's policies and procedures. Each provider 120, 121, 122 is thereby advantaged by accelerated matching of the machine 110 to a machine identity history file and earlier detection and counteraction of response indicators, while maintaining the capability to customize the response executed by the respective provider 120, 121, 122 to the machine 110.

Referring now to FIG. 3, shown generally at 200 is a preferred embodiment of a method for identifying and evaluating a machine using the system of FIG. 1. At a first step 205 a machine, which may be a machine 110 as previously described for FIG. 1, accesses a provider interface. At step 210, the provider interface, which may be a provider interface as previously described for FIG. 1, executes a fingerprint code (FPC), which may be a fingerprint code 125 as previously described for FIG. 1. As previously discussed, the fingerprint code (FPC) 125 is preferably a lightweight and portable client with no footprint, such as JavaScript, Flash or pure Java.

Shown at step 215, the FPC collects machine information and session information during the online session, as previously described for FIG. 1. At step 220 the FPC transmits the collected information, to a server such as server 130 of FIG. 1, for transformation by an MESC generator, which may be a machine identity generator 135 as previously described for FIG. 1. The MESC generator may be accessed through the server as shown in FIG. 3, or may be configured as code included in the FPC, as previously discussed for FIG. 1.

At step 225, the MESC generator 135 transforms the information collected from the online session into a machine identity which includes a machine effective speed calibration (MESC). The MESC provides sufficient differentiation such that the machine identity including the MESC is unique to the machine used in step 205 to access the website. A detailed description of the process and method for generating a machine identity including a machine effective speed calibration (MESC) follows.

The machine information collected by the FPC will include information related to one or more characteristics of the machine which are influenced or modified by variances in the manufacturing process of the elements of the machine from which the characteristic is derived, such as the speed, graphics capabilities or memory latency of a machine. The manufacturing variability of each element produces a distribution or range of performance within the population of elements. Further the combination of elements in computers which are built to identical specifications and are of the same configuration, produces a wider distribution or range of performance within the population of similarly configured computers. Machine information may be collected from one or a combination of the machine elements, which may include the machine processor, a memory element, a hard disk, a graphics card or other hardware element of the machine, understanding each element represents a unique combination of as-manufactured and operating characteristics.

Therefore, two machines may be identically configured and built to identical specifications, for example, the two machines will each have the same specified speed (e.g., 3 GHz), yet because of variation in the manufacturing processes producing the hardware elements in each of the two machines, and/or the interactions or operating characteristics of the combination of hardware elements in each of the two machines, the actual speeds of the two machines will be different. Accordingly, if the same program is run on these two machines, the runtimes will be different for each machine in comparison to the other machine. However the runtime of each machine in comparison with itself will be repeatable within an extremely narrow band of variation. In general, then, the time it takes to run a standard piece of code on a machine can be used as a signature or unique identity characteristic for each machine. Further, this type of machine signature can be used to determine a machine effective speed calibration (MESC) which will be unique to and characteristic of each machine. Each machine can repeatedly generate its MESC, which can be used to match a specific machine to itself by matching the machine's MESC generated at a later time to the same machine's MESC generated at an earlier time.

For another example, two machines having the same graphics card may differ in their graphics capabilities. The difference in the graphic capabilities of the two machines may be due to, for example, manufacturing variability of the respective graphics card of each machine compared with the other, or operational or performance variability of each respective card in combination with one or more hardware elements of the respective machine including the card. For the same standard picture, the display on the two machines may differ such that the screen resolution corresponding to a standard picture could provide a unique machine signature to differentiate one machine from another.

As another example, the time to load a standard picture on one of the machines may be highly repeatable such that it provides a unique machine signature, or MESC, to identify the machine by comparing a time to load a standard picture on the machine during a subsequent session to the time it took to load the standard picture on the same machine during an earlier session. The machine effective speed calibration (MESC) may be the number of iterations made by the fingerprint-code (FPC) 125 in a fixed amount of time (e.g., a second). Another MESC that may be used is the actual time it takes to run the FPC once. This time could be averaged over multiple runs (e.g., 3, 5, 10, etc.).

Provided herein is a non-limiting illustrative example of a portion of fingerprint code in the form of a simple java script that could be used to calculate the MESC. Other configurations of fingerprint codes are possible and it is understood that the FPC 125 as described herein is not limited to nor is it intended to be limited to the sample portion of the code shown in the illustrative example which follows.

```
function CalculateMESC( )
{
    var caliberation_time = 1000; //One second. (in milliseconds)
    var num_of_iterations = 0;
    //Get the start time ((in milliseconds)
    var currentTime = (new Date( )).getTime( );
    //Calculate the end time (in milliseconds) at which the calibration
will be stopped.
    var endTime = (new Date( )).getTime( ) + caliberation_time;
    while (currentTime < endTime)
    {
        num_of_iterations++;
        currentTime = (new Date( )).getTime( );
    }
    return num_of_iterations;
} //end of function CalculateMESC
```

For purposes of illustration, it is noted that the major execution path of the above script has a loop and Date.getTime( ) method, only. While the loop is simple the only execution done in each iteration is some basic arithmetic (++), one logical operation (<) and one getTime( ) which eventually queries the underlying system for current time. This simple type of FPC has minimal possible impact due to any runtime specific optimizations (Internet Explorer, Mozilla FireFox, etc.), making it ideal for calibrations, including an MESC.

The unique machine signature, also referred to as a machine identity, for a machine may consist of the MESC only. Additionally, the MESC could be used in conjunction with other machine information as a machine signature. Alternatively, one MESC can be collected per unit of time. If the machine online (browser) session remains active with the provider interface for n units of time then the n samples could be collected and averaged. The FPC and calibration could be started slightly after the provider interface (webpage) is loaded (e.g, 100 ms), as shown in steps 205 and 210 of FIG. 3. The average MESC can then be used as the machine signature. However, a simple average of n samples of MESC may mask out some information useful to identify the machine in subsequent sessions. Therefore, in addition to calculating a simple average, the individual values from each of the n samples can be collected and another calculation can be performed to generate a descriptive statistic for the n samples of MESC. For example, the high and low sample values can be removed before averaging the remaining samples, or values with high variation from the average can be ignored in calculating the average, and the modified average MESC can be used as a machine signature or machine identity. Alternatively, the collected and calibrated data for the machine can be clustered using any clustering algorithm to derive more accurate machine signatures. Other statistically descriptive parameters of the n samples may be used individually or in combination with the MESC to establish a unique machine signature or machine identity.

A machine signature may also consist of an MESC or combination of different MESCs of the machine in conjunction with other of the machine attributes, such as the machine IP address, browser type and version, operating system (OS) type and version, screen settings, locale and language of the machine, etc.

In some scenarios, such as in a corporate network, the IP address of a machine is configured to use a proxy server that connects to the Internet. As a result, when a machine configured in this manner is used to access the provider interface, the FPC and/or provider server will detect the IP address of the proxy, and will fail to detect the actual IP address of the machine. The proxy IP address, because it represents multiple different machines in a network, is less reliable as a determinant in machine identification, therefore it is preferable to obtain the IP address of the actual machine and to use the IP address of the actual machine to produce a machine signature. Provided herein is a mechanism to determine the IP address of the machine even when it is configured to connect through a proxy. A lightweight client with no footprint such as Java Applet or Flash is used to create an unsigned applet. The applet executes from the provider interface, generates a socket, makes a connection to the proxy server, and the local address is obtained from this socket. The local address is typically the IP address of the machine where the applet is running, therefore by obtaining the local address, the IP address of the actual machine used for the online session may be obtained. The machine IP address obtained through this approach can then be used as a reliable factor in the machine identification.

In the case of mobile devices, such as a laptop, netbook, notebook, personal digital assistant (PDA), smart phone, etc., the machine speed may change based on the power supply. For instance, the machine speed may be less (slower) when running on a battery compared to the speed while on operating on main power, such as when the machine is connected to an electrical outlet or main power source, through an adapter, for example. This difference may be significant as detected by the calculated or derived MESC. As a result, there is a many to many mapping between the speed and the machine, which must be considered when transforming the collected information into an MESC. The differences arising from this many to many mapping may be managed as a compensating factor in the process of comparing near identical MESCs generated from mobile machines.

Referring again to FIG. 3, at step 230 an MESC comparator 145 compares the MESC generated in Step 225 to a machine identity database or MESC database. As previously described, the MESC database is comprised of machine identity history files, where each machine identity history file corresponds with a uniquely identified machine used for one or more online sessions. Each unique machine identity history file includes one or more datasets. Each dataset includes the session information and machine identity including the MESC for a single online session conducted by the particular (unique) machine corresponding with the unique machine history file to which the dataset is assigned.

The MESC comparator 145 compares the session machine identity generated in step 225 to determine if the current session machine identity including a current session MESC can be matched to a prior machine identity in the MESC database, by comparing the session machine identity and MESC to the prior machine identities and MESCs in the session datasets in the MESC database. At step 235, if the MESC comparator 145 finds a matching MESC in the database, it is determined that the machine used in current session (at step 205) is the same machine corresponding to the matching MESC from the database. At step 270, the matching machine history file is updated with the current session MESC (from step 225) and the machine information and session information collected in step 215.

If, at step 235, the MESC comparator 145 fails to find a matching machine identity and/or MESC, the method proceeds to step 240, where the MESC comparator compares the current session information and MESC to the existing prior session datasets in the MESC database to determine if there is a similar or near identical machine identity and/or MESC in the database. If, at step 240, the MESC comparator fails to find a similar or near identical machine identity or MESC in the database, the MESC generator determines the machine used for the current session is new to the database, and proceeds at step 265 to create a new machine identity history file. The current session machine identity including the MESC from step 225 and the current session machine information and session information collected in step 215 are added to the new machine identity history file as a session dataset.

If, at step 240, the MESC comparator 145 finds a similar or near identical machine identity or MESC in the database, the MESC comparator 145 at step 245 evaluates the information corresponding to the current session information and MESC, and the information related to similar or near identical MESC, for compensating factors. Compensating factors may include, for example, a machine load, a machine power level, a change in or modification to a user interface type, a user interface version, a change in or modification to a hardware element or operating system of the machine, or noise in the data, which may cause assignable variation in the MESC. By identifying and negating variation attributable to these compensating factors, a similar or near identical machine identity and/or MESC can be modified to qualify as a matching MESC with high confidence.

The use of compensating factors, such as compensating for an updated version of a web browser used by the unique machine in a subsequent online session, may also require manipulating or normalizing the machine identity or MESC, wherein the machine identity or MESC including or derived from the changed factor or element, in the present example, the updated version of the web browser, is normalized for the changed element so that the current machine identity, MESC and/or session information may be compared to the prior session datasets existing in the MESC database. It is understood that factors or elements other than the web browser version can be normalized. For example, in the instance where updating of a hardware element, such as a graphics card, is detected during collection of the current session information by the FPC at step 215, the MESC comparator 145 may normalize the dataset produced by the current session to allow comparison of the current session information and the current MESC with prior session datasets existing in the MESC database.

Referring again to FIG. 3 and to step 215, information related to the compensating factors can be collected with the machine and session information collected by the FPC. At step 250, if the analysis performed at step 245 finds compensating factors are present, the method proceeds to step 255 and the session information and similar machine identity information are compared, which may include or require manipulation or normalization of the information, as described previously. At step 260, if the session information including the session MESC are determined to be matched to the similar machine identity found in the database at step 240, then the method continues to step 270, the current session machine is determined to be a matching machine, and the matching machine identity history file is updated with the session dataset and session machine identity. If, at step 250, it is determined that compensating factors are not present, e.g., it is determined there is no machine in the MESC database which matches the current session machine, then the method continues to step 265, and a new machine identity history file is created for the current session machine and added to the MESC database. The session information from the current session is included in the new machine identity history file as a session dataset. Further, if at step 260, the session information is determined not to match the similar machine identity, the method continues to step 265, and a new machine identity history file is created for the current session machine and added to the MESC database. The session information from the current session is included in the new machine identity history file as a session dataset. The compensating factor information can be included with the dataset which is stored for the machine and session in the MESC database, at either step 270 for a matching machine or at step 265 for a new machine.

In practice, the MESC may not be very sensitive to machine load, and a machine's load can typically be assumed stable over time unless the machine is being used, for example, as a server or as a developer machine. However, a method can be used for calculating the relative load on the machine using a lightweight JavaScript, and to counterbalance the effect of changes in machine load on the MESC, if required. For example, JavaScript's timeout functions setTimeout( ), setInterval( ) can be used to indirectly measure the indicator that represents the current load on the machine. The difference between the expected delay and the resulting delay in performing any task is proportional to the current load on the machine. The difference, e.g. (resulting delay−expected delay), increases with increasing load on the machine and can be used to adjust or compensate the MESC for changes in machine load over time.

The MESC may also be affected by the runtime related to the browser type and version used in the online session. The values collected using an FPC written in JavaScript, which may include for example, the time it takes to run a standard piece of code on a machine, may change based on the type and version of the browser used. Because the browser information can easily be obtained and collected at step 215, the session MESC can be compensated for the browser information to allow comparison of the session MESC to a near identical MESC generated from a session using a different browser type or browser version.

Referring again to FIG. 3, after the matching machine history file is updated at step 270, the MESC comparator 145 may initiate a review and analysis of the matching machine identity history file, as shown at step 275, for the presence of response indicators. A response indicator may be, for example, a record in the history file indicating that the machine has been previously used for a fraudulent transaction or has been used for multiple failed login and password attempts. A response indicator may also be, for example, a fraud indicator, a security risk indicator or a false identity indicator that is derived by analysis of the multiple datasets in the history file, or analysis of the session and machine information included in datasets, for patterns and other indicators.

If, at step 280, one or more response indicators are detected in the matching machine identity history file, one or more responses may be selected and executed at step 285, to process, address and/or counteract the detected response indicator or indicators. A response may be one of collecting additional information, requesting additional information, elevating security, disabling a password, denying a transaction, denying access, and terminating a session, or a combination of these or other actions as required to address internet security concerns, comply with provider policies and procedures and/or manage the provider-user transaction or account, by way of non-limiting example. A response may be selected and executed either automatically or selectively within the scope of the claimed invention. Optionally (not shown on FIG. 3), the MESC history file may be updated with a record of the response executed and additional information related to the execution of the response.

While the best modes for carrying out the invention have been described in detail, those familiar with the art to which this invention relates will recognize various alternative designs and embodiments for practicing the invention within the scope of the appended claims.

The invention claimed is:

1. A method for identifying a machine used for an online session with a provider, comprising:
accessing a provider interface during a first session using a first machine;
executing a fingerprint code using the provider interface;
collecting first session information using the fingerprint code; wherein the first session information includes machine information collected from the first machine;
transmitting the first session information to a machine identity generator using the provider interface; and
transforming a portion of the first session information to generate a first machine identity using the machine identity generator, including generating a first machine effective speed calibration (MESC).

2. The method of claim 1,
wherein accessing the provider interface during the first session includes using a user interface configured for online access; and
wherein collecting the first session information includes collecting user interface information from the user interface used for the first session.

3. The method of claim 1, wherein transforming a portion of the first session information includes transforming the machine information collected from the first machine including machine information collected from at least one of a machine processor, a machine memory, a machine hard disk, and a machine graphics card of the first machine.

4. The method of claim 1, wherein the first machine is one of a computer, a netbook, a notebook, a telephone, a mobile device, and a personal digital assistant configured for online access.

5. The method of claim 1, wherein collecting information using the fingerprint code includes at least one of:
measuring a runtime of one or more iterations of a portion of the fingerprint code; and
counting the number of iterations completed by a portion of the fingerprint code in a fixed amount of time.

6. The method of claim 1, wherein generating a first machine effective speed calibration includes one of:
determining an average or other statistical parameter of a portion of the first session information; and
applying a clustering algorithm to a portion of the first session information.

7. The method of claim 1, wherein the first machine is connected through a proxy server during the first session, creating a socket to the proxy server to detect the machine IP address.

8. The method of claim 1, further comprising:
generating a first machine identity history file corresponding to the first machine identity;
storing the first machine identity history file in a machine identity database using a server; and
storing a first session dataset including the first machine identity and the first session information in the first machine identity history file.

9. The method of claim 8, further comprising:
accessing a provider interface during one or more subsequent sessions using a subsequent machine, wherein the subsequent machine is one of a plurality of machines;

executing the fingerprint code using the provider interface;
collecting subsequent session information using the fingerprint code;
wherein the subsequent session information includes subsequent machine information collected from the subsequent machine;
transmitting the subsequent session information to the machine identity generator using the provider interface;
transforming a portion of the subsequent session information to generate a subsequent machine identity using the machine identity generator, wherein generating the subsequent machine identity includes generating a subsequent machine effective speed calibration (MESC);
comparing the subsequent machine identity to a plurality of machine identity history files in a machine identity database using a machine identity comparator, wherein each respective one of the plurality of machine identity history files corresponds to a respective one of a plurality of machine identities;
determining whether the subsequent machine identity matches one of the plurality of machine identities; and
one of:
  storing the subsequent machine identity and subsequent session information to the machine identity history file corresponding to the matching one of the plurality of machine identities when a match is determined; and
  generating a new machine identity history file corresponding to the subsequent machine identity after a match is not determined, and storing the new machine identity history file in the machine identity database.

10. The method of claim 9, wherein determining whether the subsequent machine identity matches one of the plurality of machine identities further comprises:
identifying a compensating factor in the subsequent session information when no match is determined;
manipulating the subsequent session information for the compensating factor, using the machine identity comparator;
determining whether the manipulated subsequent machine identity matches one of the plurality of machine identities; and
one of:
  storing the subsequent machine identity and subsequent session information to the machine identity history file corresponding to the matching one of the plurality of machine identities when a match to the manipulated subsequent machine identity is determined; and
  generating a new machine identity history file corresponding to the subsequent machine identity after no match to the normalized subsequent machine identity is determined, and storing the new machine identity history file in the machine identity database.

11. The method of claim 10, wherein the factor is one of a machine load, a machine power level, a user interface type, and a user interface version.

12. The method of claim 9, further comprising:
analyzing the machine identity history file corresponding to the subsequent machine for a response indicator using the MESC comparator; and
executing a response to the at least one response indicator when at least one response indicator is detected.

13. The method of claim 12,
wherein the response indicator is one of a fraud indicator, a security indicator and a false identity indicator; and
wherein the response to the response indicator is one of collecting additional information, requesting additional information, elevating security, disabling a password, denying a transaction, denying access, and terminating a session.

14. A system for identifying a machine used for an online session with a provider, comprising:
a machine adapted for online access;
a provider interface adapted to execute a fingerprint code during the online session and to transmit session information, wherein the fingerprint code is configured to collect the session information from the machine when the machine accesses the provider interface;
a machine identity generator configured to receive the session information;
wherein the machine identity generator is further configured to transform a portion of the session information into a machine identity including a machine effective speed calibration (MESC); and
a server configured to interface with the provider interface, the machine identity generator and a database, wherein the database is configured to store the machine identity, the machine effective speed calibration, and the session information in a machine identity file corresponding to the machine used during the online session to access the provider interface.

15. The system of claim 14, further comprising:
a subsequent machine configured for online access;
wherein a subsequent machine identity is generated by the machine identity generator using subsequent machine session information collected by the fingerprint code when the subsequent machine accesses the provider interface;
a plurality of machine identity files stored in the database, wherein each machine identity file corresponds to a respective one of a plurality of machines adapted for online access;
a machine identity comparator configured to compare the subsequent machine identity to the plurality of machine identity files to determine whether the subsequent machine identity matches one of the plurality of machine identity files in the database;
wherein the machine identity comparator is configured to store the subsequent machine identity and corresponding session information in a matching machine identity file when the matching machine identity file is determined; and
wherein the machine identity comparator is further configured to store the subsequent machine identity and corresponding session information as a session dataset in a new machine identity file in the database when no matching machine identity file is determined, wherein the new machine identity file corresponds to the subsequent machine.

16. The system of claim 14, wherein the machine is one of a computer, a netbook, a notebook, a telephone, a mobile device, and a personal digital assistant configured for online access.

17. The system of claim 14, wherein the session information includes at least one of machine information, a runtime of one or more iterations of a portion of the fingerprint code, and a number of iterations completed by a portion of the fingerprint code in a fixed amount of time; and
wherein the machine effective speed calibration is generated from at least one of:
  a runtime of one or more iterations of a portion of the fingerprint code, a number of iterations completed by a portion of the fingerprint code in a fixed amount of time;

an average or other statistical parameter of multiple runtimes of one or more iterations of a portion of the fingerprint code;

an average or other statistical parameter of multiple samples of the number of iterations completed by a portion of the fingerprint code in a fixed amount of time; and a clustering algorithm applied to a portion of the session information.

18. The system of claim 15, further comprising:

a user interface;

wherein the session information includes a compensating factor;

wherein the machine identity comparator is further configured to manipulate the compensating factor to compare the machine identity of the subsequent machine to the plurality of machine identity files to determine whether the subsequent machine identity matches one of the plurality of machine identity files in the database.

19. The system of claim 15, wherein the machine identity file matched to the at least one subsequent machine includes at least two session datasets;

wherein each respective one of the at least two session datasets corresponds to a respective online session of the subsequent machine with the provider interface;

wherein each respective one of the at least two session datasets includes a respective machine identity, a respective machine effective speed calibration, and respective session information corresponding to the respective online session;

wherein one of the machine identity comparator and the server is further adapted to analyze the at least two session datasets of the machine identity file matched to the at least one subsequent machine for the presence of a response indicator, and to automatically execute a response when the analysis detects the response indicator in the machine identity file.

20. The system of claim 19, further comprising:

a plurality of provider interfaces each adapted to execute a fingerprint code during an online session and to transmit session information;

wherein the fingerprint code is adapted to collect the session information from the subsequent machine when the subsequent machine accesses a respective one of the plurality of provider interfaces;

wherein the session information stored in the session dataset identifies the respective one of the plurality of provider interfaces accessed by the subsequent machine during the session;

wherein the one of the machine identity comparator and the server includes one of a provider-designated response indicator and a provider-designated response which is designated by one of the plurality of provider interfaces;

wherein the one of the machine identity comparator and the server is adapted to analyze the at least two session datasets of the machine identity file matched to the subsequent machine for the presence of a provider-designated response indicator and a provider-designated response designated by the respective one of the plurality of provider interfaces.

* * * * *